(12) United States Patent
Horiguchi et al.

(10) Patent No.: US 8,562,148 B2
(45) Date of Patent: Oct. 22, 2013

(54) CONTROL DEVICE AND ELECTRONIC DEVICE

(75) Inventors: Hirosada Horiguchi, Minowa-machi (JP); Hiroshi Yoshimoto, Suwa (JP); Tadashi Yamada, Chino (JP)

(73) Assignee: Seiko Epson Corporation, Tokyo (JP)

( * ) Notice: Subject to any disclaimer, the term of this patent is extended or adjusted under 35 U.S.C. 154(b) by 358 days.

(21) Appl. No.: 12/904,516

(22) Filed: Oct. 14, 2010

(65) Prior Publication Data

US 2011/0096233 A1 Apr. 28, 2011

(30) Foreign Application Priority Data

Oct. 22, 2009 (JP) ................................. 2009-243626

(51) Int. Cl.
*G03B 21/20* (2006.01)

(52) U.S. Cl.
USPC .................... 353/85; 353/31; 353/37; 353/88; 353/98; 353/99; 345/98; 345/99

(58) Field of Classification Search
USPC .............. 353/31, 37, 85, 88, 94, 98–99, 122; 345/89–102, 690–699; 349/5, 7–9, 349/149, 150, 152, 167; 362/97.1–97.4; 348/671–675
See application file for complete search history.

(56) References Cited

U.S. PATENT DOCUMENTS

| | | | | |
|---|---|---|---|---|
| 5,729,297 A | * | 3/1998 | Kwon | 348/458 |
| 7,220,006 B2 | * | 5/2007 | Allen et al. | 353/85 |
| 7,631,974 B2 | * | 12/2009 | Mukai | 353/85 |
| 7,787,172 B2 | * | 8/2010 | Shirai et al. | 359/292 |
| 7,857,466 B2 | * | 12/2010 | Inoue et al. | 353/122 |
| 8,162,490 B2 | * | 4/2012 | Onishi et al. | 353/122 |
| 2004/0169774 A1 | * | 9/2004 | Hibi et al. | 348/744 |
| 2005/0184952 A1 | * | 8/2005 | Konno et al. | 345/102 |
| 2006/0012759 A1 | * | 1/2006 | Matsushita | 353/94 |
| 2006/0285025 A1 | * | 12/2006 | Yoshida et al. | 349/8 |
| 2007/0052735 A1 | * | 3/2007 | Chou | 345/690 |
| 2008/0136763 A1 | | 6/2008 | Ohashi | |
| 2009/0086102 A1 | * | 4/2009 | Uchinuno et al. | 348/674 |
| 2009/0160754 A1 | | 6/2009 | Nagai | |
| 2009/0167956 A1 | * | 7/2009 | Miyazawa | 348/672 |
| 2009/0268105 A1 | * | 10/2009 | Kohashikawa et al. | 348/790 |

FOREIGN PATENT DOCUMENTS

| | | |
|---|---|---|
| JP | 5-66501 A | 3/1993 |
| JP | 2003-186111 A | 7/2003 |
| JP | 2008-148055 A | 8/2008 |
| JP | 2009-15956 A | 7/2009 |

\* cited by examiner

*Primary Examiner* — Georgia Y Epps
*Assistant Examiner* — Sultan Chowdhury
(74) *Attorney, Agent, or Firm* — ALG Intellectual Property, LLC (57) ABSTRACT

A control device that controls a video signal to be input to a display device and controls the luminance of a light source that causes light to be incident on the display device includes: a light source luminance control section that controls the luminance of the light source by means of a light source luminance control signal; a storage section that stores relationships between light source luminance control signals and video correction amounts; a video correction signal generating section that generates, on the basis of the video correction amount that is stored in the storage section and corresponds to the generated light source luminance control signal, a video correction signal that is used to correct the video signal; and a video signal correcting section that corrects the video signal by means of the video correction signal.

5 Claims, 7 Drawing Sheets

| LIGHT SOURCE CONTROL VALUE | CORRECTION COEFFICIENT FOR R | CORRECTION COEFFICIENT FOR G | CORRECTION COEFFICIENT FOR B |
|---|---|---|---|
| 100% | 1 | 1 | 1 |
| 80% | 0.80 | 0.85 | 1 |
| 60% | 0.65 | 0.75 | 1 |
| 40% | 0.50 | 0.70 | 1 |
| 20% | 0.45 | 0.65 | 1 |

CONTROL DEVICE AND ELECTRONIC DEVICE

BACKGROUND

1. Technical Field

The present invention relates to the technical field of a control device that controls a display device such as an electrooptic device, and of an electronic device such as a liquid crystal projector that includes the control device.

2. Related Art

As this type of control device, there is a control device that controls a liquid crystal display device that displays an image by causing light emitted by a light source to be incident on a liquid crystal panel. For such a liquid crystal display device, a technique is known, which controls the luminance of a light source using a dimming unit (for example, refer to JP-A-2003-186111). The control device controls the dimming unit on the basis of a video signal or the like and achieves luminance that is suitable for the video signal (for example, refer to JP-A-5-66501).

However, when the luminance is changed on the basis of the video signal by the aforementioned technique, the spectrum of the light emitted by the light source may be changed. When the spectrum is changed, the white balance of a displayed video image is largely changed. Thus, the aforementioned technique has a technical problem that the quality of the video image may be reduced due to the change in the luminance.

SUMMARY

An advantage of some aspects of the invention is that it provides a control device that is capable of controlling a display device such as an electrooptic device so that the display device displays a high-quality video image.

According to a first aspect of the invention, a control device that controls a video signal to be input to a display device and controls the luminance of a light source that causes light to be incident on the display device includes: a video signal analyzing section that analyzes the video signal; a light source luminance control signal generating section that generates, on the basis of the results of the analysis, a light source luminance control signal that is used to control the luminance of the light source; a light source luminance control section that controls the luminance of the light source by means of the light source luminance control signal; a storage section that stores relationships between light source luminance control signals and video correction amounts; a video correction signal generating section that generates, on the basis of the video correction amount that is stored in the storage section and corresponds to the generated light source luminance control signal, a video correction signal that is used to correct the video signal; a video signal correcting section that corrects the video signal by means of the video correction signal; and a video signal output section that outputs the corrected video signal to the display device.

The control device according to the first aspect of the invention controls the display device (that displays a video image) by causing the light emitted by the light source to be incident on a liquid crystal panel or the like. Three video signals are input to the display device, for example. Typically, the three video signals correspond to RGB three primary colors, respectively. The display device may include liquid crystal panels that correspond to three video signals of RGB primary colors, respectively. In addition, the display device may include a single liquid crystal panel that uses a technique such as a field sequential system and is capable of displaying a video image that corresponds to three video signals.

During an operation of the control device according to the first aspect of the invention, the video signal that is to be input to the display device is analyzed by the video signal analyzing section. Specifically, the video signal analyzing section analyzes the brightness or the like of a video image to be displayed on the basis of the video signal and acquires information that is used to generate the light source luminance control signal (described later) and information that is used to perform a decompressing process on the video signal.

Next, the light source luminance control signal generating section generates the light source luminance control signal that is used to control the luminance (i.e., amount of light that is incident on the display device from the light source) of the light source. The light source luminance control signal includes a control value (e.g., power value of the light source) that is used to control the light source. Since the light source luminance control signal generating section generates the light source luminance control signal on the basis of the analysis performed by the video signal analyzing section, the light source luminance control signal is generated on the basis of the video signal.

Specifically, when a relatively bright video image is to be displayed on the basis of the video signal, the generated light source luminance control signal includes a relatively high control value (that causes light emitted by the light source to be bright). When a relatively dark video image is to be displayed on the basis of the video signal, the generated light source luminance control signal includes a relatively low control value (that causes light emitted by the light source to be dark). The relationship between the video signal and the control value is pre-calculated on the basis of an experiment, a theory, or experience.

When the light source luminance control signal is generated, the light source luminance control section controls the luminance of the light source on the basis of the light source luminance control signal. Thus, since light that corresponds to the brightness of the video image is incident on the display device, a high contrast can be achieved.

The video correction signal generating section generates the video correction signal that is used to correct the video signal. In this case, the correction is performed to support a change (caused by a change in the luminance of the light source) in the spectrum of the light. The correction has an effect to reduce a change (caused by the change in the spectrum of the light) in white balance. The video correction signal is generated on the basis of the light source luminance control signal. In other words, the video correction signal is generated on the basis of the luminance of the light source. The relationship between the luminance of the light source and the video correction signal is pre-calculated through an experiment, a theory, or experience.

The storage section stores the relationships between the light source luminance control signals and the video correction amounts. Specifically, a table or the like that indicates the relationships between control values included in the light source luminance control signals and the video correction amounts (that correspond to the control values) is pre-stored in a memory (that is an example of the storage section) or the like. When the luminance of the light source is controlled by means of the control value included in the light source luminance control signal, the video correction amount is associated with the control value as a correction amount (that causes the input video signal to be suitable for the controlled luminance) that allows the video image to be displayed with higher quality.

The video correction signal generating section generates a video correction signal by selecting, from among the video correction amounts stored in the storage section, a video correction amount that corresponds to the generated light source luminance control signal. Thus, the video correction signal generating section can easily and appropriately generate the video correction signal without performing a complex calculation or the like using the control value included in the light source luminance control signal or the like. Therefore, the device can be simply configured and simply perform the control.

When the video correction signal is generated, the video signal correcting section corrects the video signal on the basis of the video correction signal. Thus, it is possible to eliminate or reduce an adverse effect caused by a change in the spectrum of the light. The video signal is corrected by, for example, changing a relative proportion of each of three video signals.

The video signal output section outputs the corrected video signal to the display device. The display device displays a video image on the basis of the corrected video signal. Since the adverse effect caused by the change in the spectrum of the light is eliminated or reduced as described above, the video image can be displayed with high quality.

As described above, in the control device according to the first aspect of the invention, the correction is performed to support a change (caused by a change in the luminance of the light source) in the spectrum of the light. Thus, the display device such as an electrooptic device can display the video image with high quality.

According to a second aspect of the invention, in the control device according to the first aspect of the invention, it is preferable that when a value of the video correction signal, which corresponds to the light source luminance control signal, is not stored in the storage section, the video correction signal generating section interpolate the value of the video correction signal on the basis of the video correction amounts stored in the storage section and generates the video correction signal.

In the control device according to the second aspect of the invention, even when the value of the video correction signal that corresponds to the light source luminance control signal is not stored in the storage section, an appropriate value of the video correction signal can be calculated using a straight line approximation or the like on the basis of the values stored in the storage section. In other words, since the value of the video correction signal can be interpolated, the storage section does not need to store a large amount of information. Thus, the video correction signal can be generated in a more preferable manner.

According to a third aspect of the invention, in the control device according to the first aspect of the invention, it is preferable that the video signal correcting section correct the video signal in synchronization with a drive frequency of the display device.

According to the third aspect of the invention, the video signal correcting section corrects the video signal in synchronization with the display device. In this case, the synchronization is not limited to the case where the drive frequency of the display device completely matches an execution frequency required for the correction of the video signal. The video signal correcting section may correct the video signal on the basis of the time when the display device is driven.

Since the video signal correcting section corrects the video signal in synchronization with the drive frequency of the display device, it is possible to reduce the occurrence of a failure that is caused by the correction. Specifically, it is possible to prevent a failure from occurring due to interference such as scroll noise. Thus, it is possible to reliably display a video image with high quality.

According to a fourth aspect of the invention, in the control device according to the first aspect of the invention, it is preferable that the video signal be constituted by at least three signals and the video correction signal generating section generate the video correction signal as a signal that indicates coefficients that correspond to the at least three signals, respectively.

According to the fourth aspect of the invention, the generated video correction signal indicates the coefficients that correspond to the at least three signals, respectively. In other words, the video correction signal includes at least three coefficients. Each of the coefficients is calculated using a preset and predetermined equation or the like.

According to the fourth aspect of the invention, the video signal correcting section performs the correction using the coefficients included in the video correction signal. Specifically, arithmetic processing is performed on the video signal using the coefficients included in the video correction signal so that the relative proportion of each of the at least three signals is changed. Thus, the video signal can be easily and reliably corrected.

According to a fifth aspect of the invention, in the control device according to the fourth aspect of the invention, it is preferable that the video correction signal generating section set one of the at least three signals as a reference signal and determine, on the basis of the reference signal, the coefficients that correspond to the other signals of the at least three signals.

In this case, the video correction signal generating section does not need to determine the coefficients that correspond to the at least three signals. The video correction signal generating section determines the coefficients that correspond to the signals other than the reference signal. When the reference video signal is set and the number of the signals is three, the number of the signals to be determined is two. The video signal can be corrected in a simpler manner.

According to a sixth aspect of the invention, an electronic device includes: a display device to which at least three video signals are input; a light source that causes light to be incident on the display device; and the control device according to any of the first to fifth aspects of the invention.

According to the sixth aspect of the invention, since the electronic device includes the control device according to any of the first to fifth aspects of the invention, the electronic device can be applied to various electronic devices (such as a projection-type display device and a television) that are capable of displaying a video image with high quality.

Effects and advantages of the invention are apparent from the following embodiment of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention is described below with reference to the accompanying drawings.

Display Device

First, the configuration of a display device that is controlled by a control device according to the embodiment is described with reference to FIGS. 1 to 3. The embodiment describes, as an example of the display device according to the invention, a liquid crystal device that has an active matrix liquid crystal panel that includes a drive circuit and thin film transistors (TFTs). The liquid crystal device may include three liquid crystal panels that are provided for three video signals, respectively. Also, the liquid crystal device may include one liquid crystal panel that uses a technique such as a field sequential system and is capable of displaying a video image that corresponds to three video signals.

The entire configuration of the liquid crystal device according to the embodiment is described below with reference to FIGS. 1 and 2. FIG. 1 is a plan view of the entire configuration of the liquid crystal device according to the embodiment. FIG. 2 is a cross sectional view of the liquid crystal device taken along a line II-II of FIG. 1.

Figure 1:
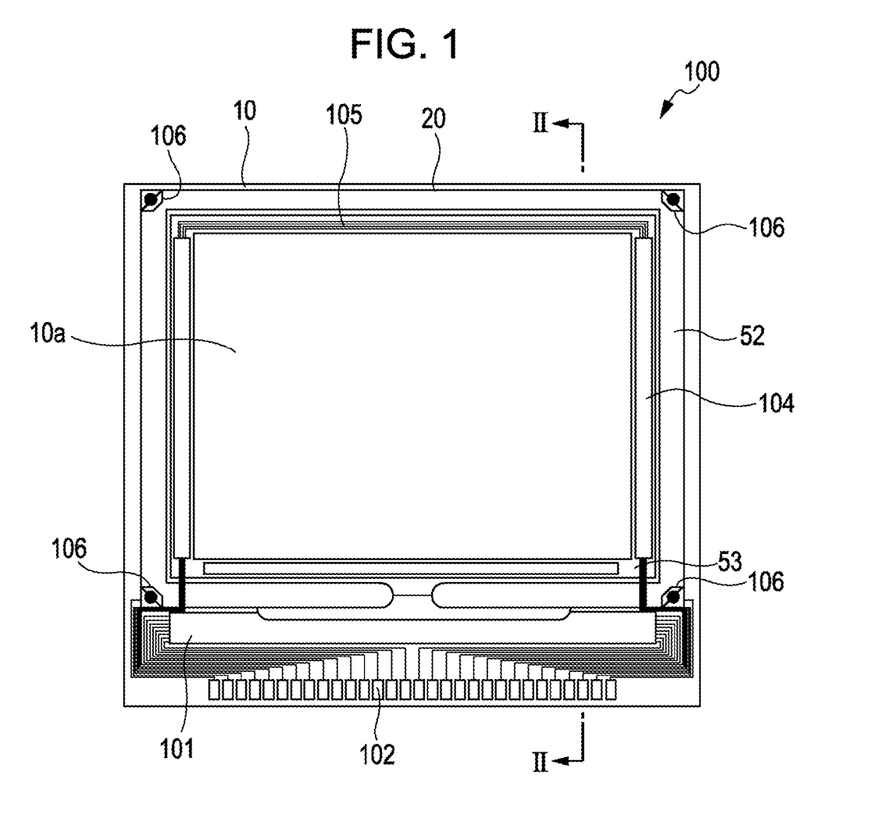
FIG. 1 is a plan view of the entire configuration of a liquid crystal device according to an embodiment of the invention.
Figure 2:
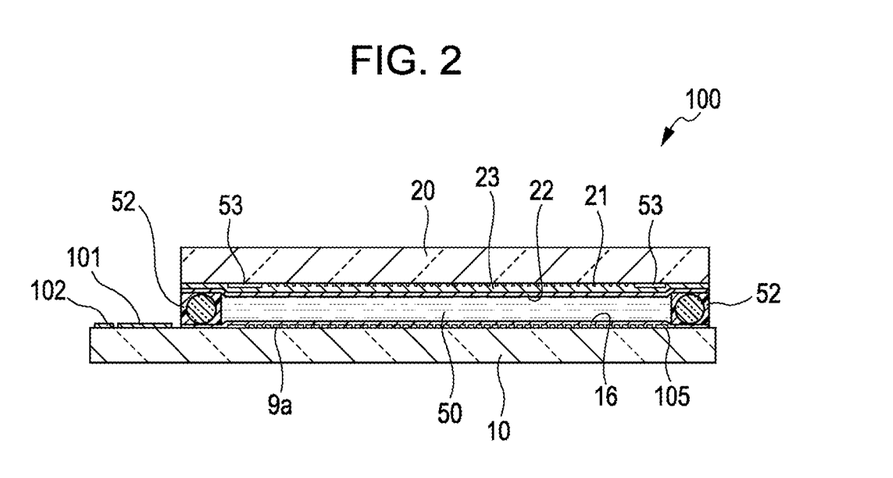
FIG. 2 is a vertical cross sectional view of the liquid crystal device taken along a line II-II of FIG. 1.

Referring to FIGS. 1 and 2, a TFT array substrate 10 and a counter substrate 20 are arranged in a liquid crystal device 100 according to the embodiment and face each other. The TFT array substrate 10 is a transparent substrate (such as a quartz substrate or a glass substrate), a silicon substrate or the like. The counter substrate 20 is a transparent substrate such as a quartz substrate or a glass substrate. A liquid crystal layer 50 is sealed between the TFT array substrate 20 and the counter substrate 10. The liquid crystal layer 50 is constituted by one or more types of nematic liquid crystal. The liquid crystal is oriented in a predetermined direction between a pair of oriented films.

The TFT array substrate 10 and the counter substrate 20 are bonded to each other by a sealing member 52 that is provided in a sealing region. The sealing region surrounds an image display region 10a of the liquid crystal device 100. A plurality of pixel electrodes 9a are provided in the image display region 10a.

The sealing member 52 is made of ultraviolet-curable resin, thermosetting resin or the like and bonds the substrates to each other. In a manufacturing process, after the sealing member 52 is coated on the TFT array substrate 10, the sealing member 52 is hardened by ultraviolet irradiation, heating or the like. A gap member such as a glass fiber or glass beads is included in the seam member 52 so that a gap between the TFT array substrate 10 and the counter substrate 20 is set to a predetermined distance. In addition to the gap member included in the sealing member 52, another gap member may be provided in the image display region 10a or in a region (surrounding region) that surrounds the image display region 10a. Instead of the gap member included in the sealing member 52, the gap member may be provided in the image display region 10a or in the region that surrounds the image display region 10a.

A frame-shaped light shielding film 53 is provided on the counter substrate 20. The frame-shaped light shielding film 53 is located on an inner side of the sealing region (in which the seal member 52 is located) and extends along the sealing region. The frame-shaped light shielding film 53 defines a frame region of the image display region 10a and has a light shielding property. A portion of the frame-shaped light shielding film 53 or the entire frame-shaped light shielding film 53 may be provided on the TFT array substrate 10 as a built-in light shielding film.

A data line driving circuit 101 and external circuit connecting terminals 102 are arranged in a region that is included in the aforementioned surrounding region and is located on an outer side of the sealing region (in which the seal member 52 is located). The data line driving circuit 101 is provided on the TFT array substrate 10 and extends along one side of the TFT array substrate 10. The external circuit connecting terminals 102 are provided on the TFT array substrate 10 and arranged along the one side of the TFT array substrate 10. Scanning line driving circuits 104 extend along two sides of the TFT array substrate 10, respectively. The two sides of the TFT array substrate 10 are adjacent to the side (of the TFT array substrate 10) along which the data line driving circuit 101 extends. In addition, the scanning line driving circuits 104 are covered with the frame-shaped light shielding film 53. Furthermore, a plurality of lines 105 are arranged along the remaining side of the TFT array substrate 10 and connect the two scanning line driving circuits 104 (arranged on both sides of the image display region 10a) to each other. The lines 105 are covered with the frame-shaped light shielding film 53.

Conductive terminals 106 are provided on the TFT array substrate 10 and located in regions near the four corners of the counter substrate 20. The conductive terminals 106 connect the two substrates to each other via conductive members. Thus, the TFT array substrate 10 and the counter substrate 20 can be electrically connected to each other by the conductive terminals 106 and the conductive members.

Referring to FIG. 2, the liquid crystal device 100 has a stacked structure on the TFT array substrate 10. The TFTs and wiring (that includes scanning lines and data lines) are arranged in the stacked structure. The TFTs serve as driving elements and are provided to switch pixels. FIG. 2 does not show the configuration of the stacked structure in detail. The pixel electrodes 9a are made of a transparent material such as indium tin oxide (ITO) and arranged on the stacked structure. The pixel electrodes 9a are provided for the pixels, respectively, and arranged in a predetermined pattern. Each of the pixel electrodes 9a is formed in an island shape.

The pixel electrodes 9a face counter electrodes 21. The pixel electrodes 9a are located on the TFT array substrate 10 in the image display region 10a. An oriented film 16 is provided on the surface (facing the liquid crystal layer 50) of the TFT array substrate 10 and the pixel electrodes 9a and covers the pixel electrodes 9a.

A light shielding film 23 is provided on the surface (facing the TFT array substrate 10) of the counter substrate 20. The light shielding film 23 has a lattice structure when the surface of the light shielding film 23 is viewed from the side of the surface (facing the TFT array substrate 10) of the counter substrate 20. A non-opening region, which is located on the counter substrate 20, is defined by the light shielding film 23. An opening region, which is located on the counter substrate 20, is partitioned by the light shielding region 23. Light, which is emitted by a lamp for a projector, direct-view backlight or the like, is transmitted through the opening region. The light shielding film 23 may have a stripe structure so that the light shielding film 23 and constituent elements (such as the data lines) located on the TFT array substrate 10 define the non-opening region.

The counter electrodes 21 that are made of a transparent material such as ITO are provided on the light shielding film 23 and face the plurality of pixel electrodes 9a. In addition, a color filter (not shown in FIG. 2) may be provided in the opening region and a part of the non-opening region on the light shielding film 23 in order to display a color image in the image display region 10a. An oriented film 22 is provided on the counter electrodes 21 that are arranged on the surface (facing the TFT array substrate 10) of the counter substrate 20.

A sampling circuit, a precharge circuit, an inspection circuit and the like may be provided on the TFT array substrate 10 (shown in FIGS. 1 and 2), in addition to the data line driving circuit 101 and the scanning line driving circuits 104. In this case, the sampling circuit samples image signals that are present on image signal lines and supplies the image signals to the data lines. The precharge circuit supplies a precharge signal of a predetermined voltage level to the plurality of data lines before the supply of the image signals. The inspection circuit inspects the quality of the liquid crystal device 100 and any defects of the liquid crystal device 100 during the manufacturing process or before shipment of the liquid crystal device 100.

Next, the electric configuration of a pixel portion of the liquid crystal device according to the present embodiment is described with reference to FIG. 3. FIG. 3 is a diagram showing equivalent circuits that include elements and lines and are provided for the pixels that are arranged in a matrix form and form the image display region of the liquid crystal device according to the present embodiment.

Figure 3:
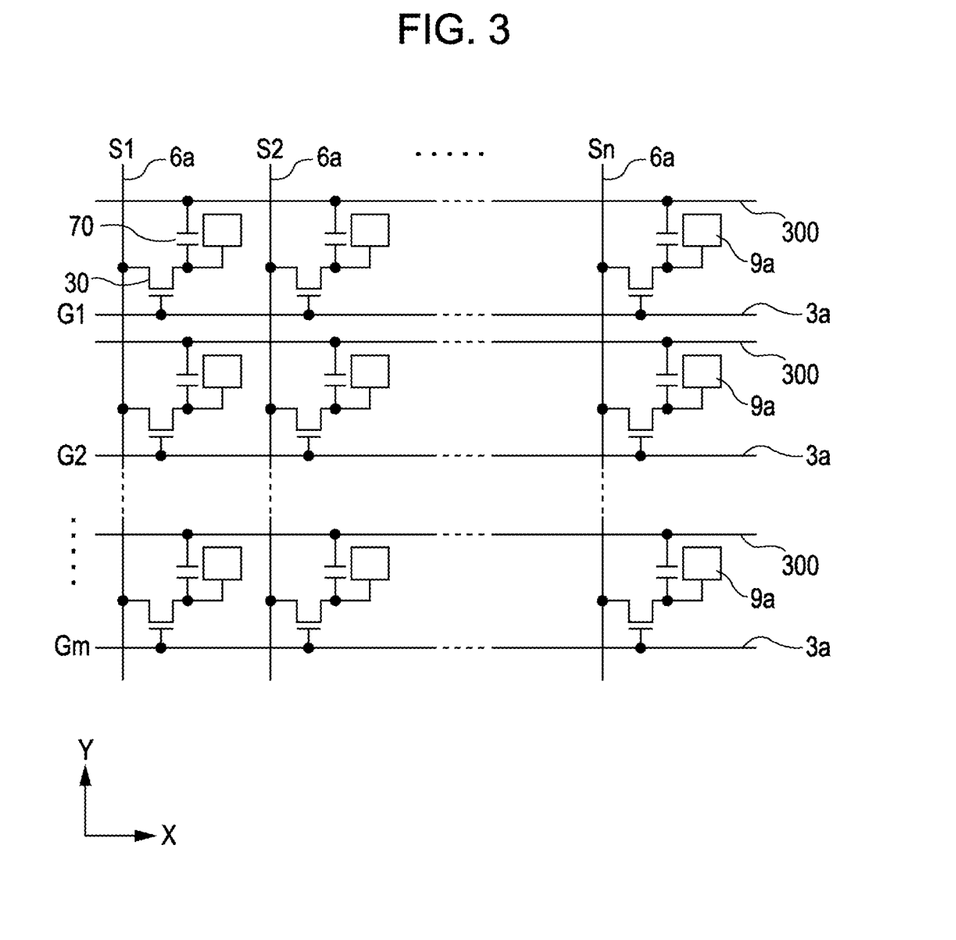
FIG. 3 is a diagram showing equivalent circuits that include elements and lines and form an image display region of the liquid crystal device according to the embodiment.

As shown in FIG. 3, each of the pixels that are arranged in a matrix form and form the image display region 10a of the liquid crystal device according to the present embodiment includes the pixel electrode 9a and the TFT 30. In each of the pixels, the TFT 30 is electrically connected to the pixel electrode 9a and switches on and off the pixel electrode 9a during an operation of the liquid crystal device 100. The data lines 6a to which the image signals are supplied are electrically connected to sources of the TFTs 30. The image signals S1, S2, . . . , and Sn may be sequentially supplied to the data lines 6a in this order. In addition, each group of image signals that is to be supplied to data lines 6a adjacent to each other may be sequentially supplied to the data lines 6a.

Gates of the TFTs 30 are electrically connected to the scanning lines 3a. In the liquid crystal device 100 according to the present embodiment, scanning signals G1, G2, . . . , and Gn are sequentially applied to the scanning lines 3a in this order at predetermined times in a pulse-like manner. The pixel electrode 9a is electrically connected to a drain of the TFT 30 in each of the pixels. The image signals S1, S2, . . . , and Sn that are supplied from the data lines 6a are written at predetermined times by switching off the TFTs 30 (serving as switching elements) for a certain time period. The image signals S1, S2, . . . , and Sn that are written in the liquid crystal (that is an example of an electrooptic material) through the pixel electrodes 9a and have a predetermined level are maintained between the pixel electrodes 9a and the counter electrodes 21 (provided on the counter substrate 20) for a certain time period.

The molecular orientation and regularity of the liquid crystal included in the liquid crystal layer 50 (shown in FIG. 2) are changed on the basis of the level of a voltage applied to the liquid crystal so that light is modulated and the gradation of an image is changed. In a normally white mode, the transmittance of the liquid crystal to light incident on the liquid crystal is reduced on the basis of a voltage applied to each of the pixels. In a normally black mode, the transmittance of the liquid crystal to light incident on the liquid crystal is increased on the basis of a voltage applied to each of the pixels. Light that has contrast corresponding to the image signals is output from the liquid crystal device 100.

A storage capacitor 70 is connected to a liquid crystal capacitor in parallel in each of the pixels in order to prevent the image signal maintained between the pixel electrode 9a and the counter electrode 21 from leaking, while the crystal capacitor is provided between the pixel electrode 9a and the counter electrode 21 (refer to FIG. 2). The storage capacitor 70 functions as a capacitive element that temporarily maintains a potential of the pixel electrode 9a on the basis of the supply of the image signal. One of electrodes of the storage capacitor 70 is electrically connected to the drain of the TFT 30 in each of the pixels. The storage capacitors 70 are connected to the pixel electrodes 9a in parallel, respectively. The other electrodes of the storage capacitors 70 are connected to potential-fixed capacitor lines 300 so that the potentials of the electrodes are at a constant level. The storage capacitors 70 improve the potential holding properties of the pixel electrodes 9a. Also, the storage capacitors 70 improve display characteristics such as contrast and reduce the occurrence of flicker.

Control Device

The following describes the control device that controls the liquid crystal device with reference to FIGS. 4 to 8.

Figure 4:
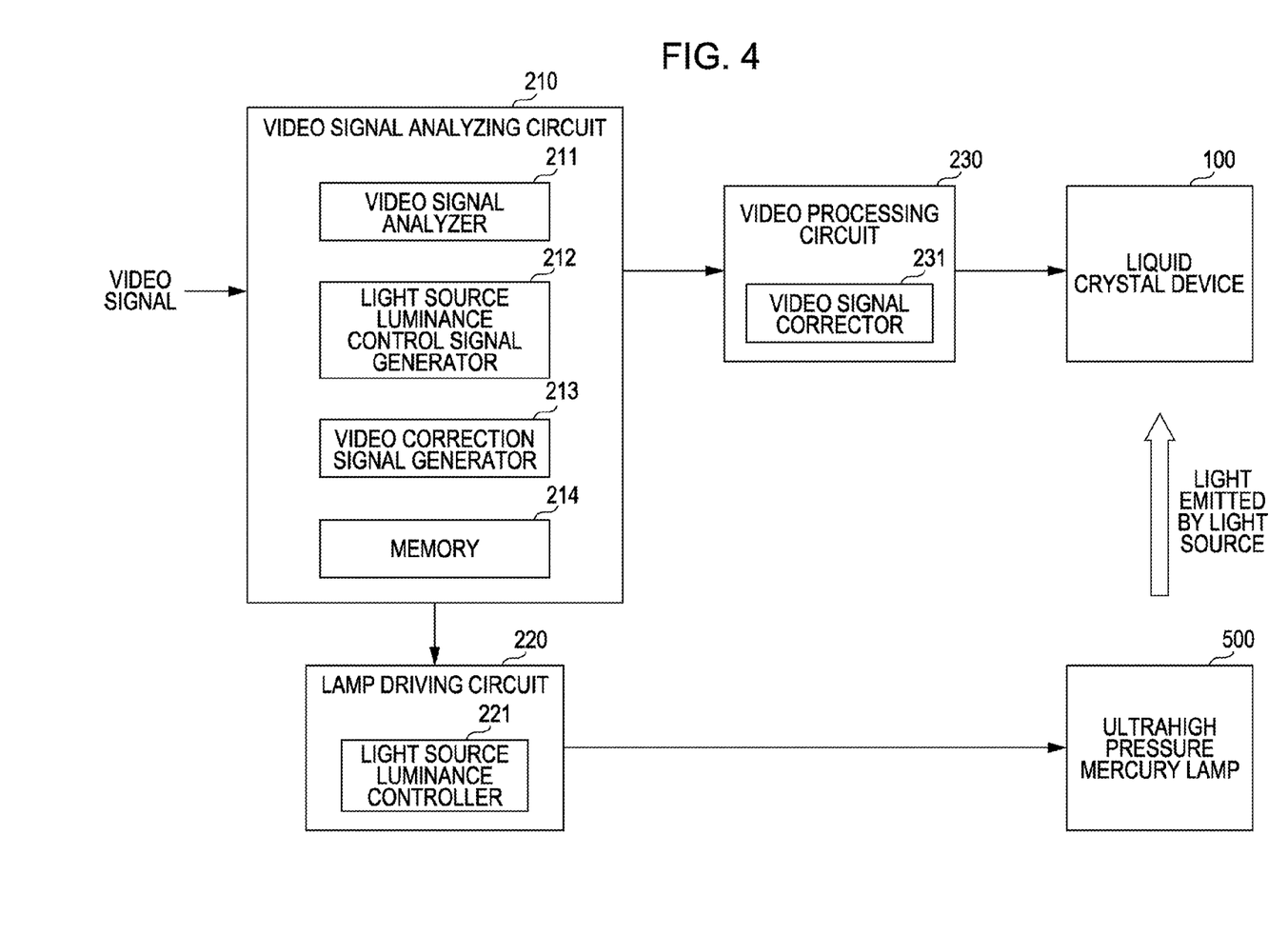
FIG. 4 is a block diagram showing the configuration of a control device according to the embodiment.

First, the configuration of the control device according to the present embodiment is described with reference to FIG. 4. FIG. 4 is a block diagram showing the configuration of the control device according to the present embodiment.

As shown in FIG. 4, the control device according to the present embodiment includes a video signal analyzing circuit 210, a lamp driving circuit 220 and a video processing circuit 230.

The video signal analyzing circuit 210 includes one or more integrated circuits. The video signal analyzing circuit 210 includes a video signal analyzer 211, a light source luminance control signal generator 212, a video correction signal generator 213 and a memory 214.

The video signal analyzer 211 is an example of a "video signal analyzing section" according to the invention. The video signal analyzer 211 analyzes a video signal received by the video signal analyzing circuit 210 and acquires information on the brightness and the like of a video image to be displayed on the basis of the video signal.

The light source luminance control signal generator 212 is an example of a "light source luminance control signal generating section" according to the invention. The light source luminance control signal generator 212 generates a light source luminance control signal on the basis of the results of the analysis performed by the video signal analyzer 211. Specifically, the light source luminance control signal generator 212 generates a light source luminance control signal that includes a light source control value (that is used to control output of a light source) based on the brightness of the video image to be displayed on the basis of the video signal. The light source luminance control signal generator 212 outputs the generated light source luminance control signal to a light source luminance controller 221 that is included in the lamp driving circuit 220.

The video correction signal generator 213 is an example of a "video correction signal generating section" according to the invention. The video correction signal generator 213 generates a video correction signal (that is used to correct the video signal) on the basis of the control value included in the light source luminance control signal. The video correction signal generator 213 outputs the generated video correction signal to a video signal corrector 231 that is included in the video processing circuit 230. The video correction signal is described later in detail.

The memory 214 is an example of a "storage section" according to the invention. The memory 214 stores the relationship between the light source luminance control signal generated by the light source luminance control signal generator 212 and the video correction signal generated by the video correction signal generator 213.

The video signal analyzing circuit 210 decompresses the video signal, in addition to the analysis of the video signal. The video signal analyzing circuit 210 outputs the decompressed video signal to the video processing circuit 230.

The lamp driving circuit 220 includes one or more integrated circuits. The lamp driving circuit 220 includes the light source luminance controller 221 that is an example of a "light source luminance control section" according to the invention. The light source luminance controller 221 controls, on the basis of the light source luminance control signal, the luminance of an ultrahigh-pressure mercury lamp 500 that is an example of a "light source" according to the invention. Specifically, the luminance is controlled by adjusting power that is to be consumed by the ultrahigh-pressure mercury lamp 500.

The video processing circuit 230 includes one or more integrated circuits. The video processing circuit 230 includes the video signal corrector 231 that is an example of a "video signal correcting section" according to the invention. The video signal corrector 231 corrects the video signal on the basis of the video correction signal. The correction of the video signal is described later in detail.

In addition to the video signal corrector 231, the video processing circuit 230 typically includes a plurality of circuits that perform various types of processing on the video signal.

Figure 5:
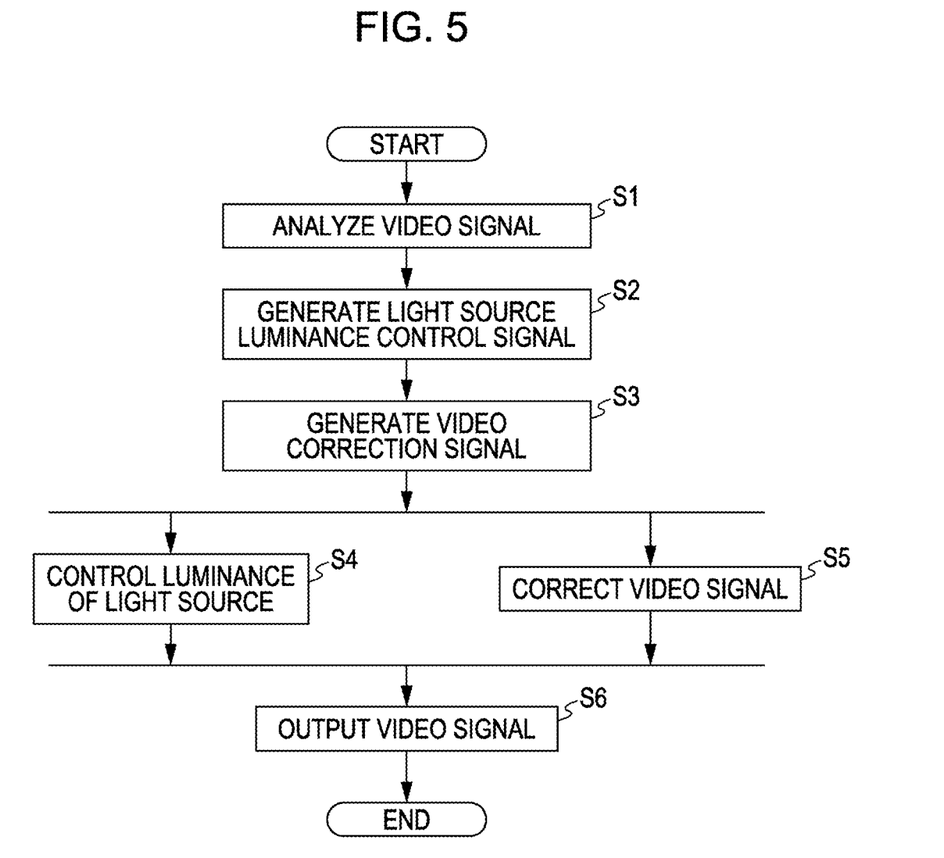
FIG. 5 is a flowchart of operations of the control device according to the embodiment.
Figure 6:
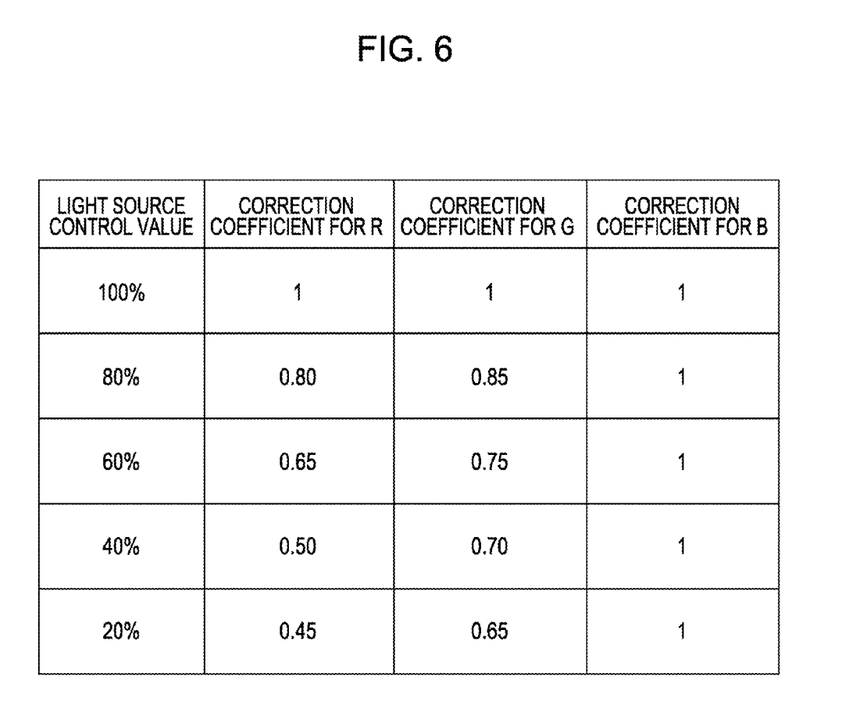
FIG. 6 is a table showing relationships between light source control values and correction coefficients.
Figure 7:
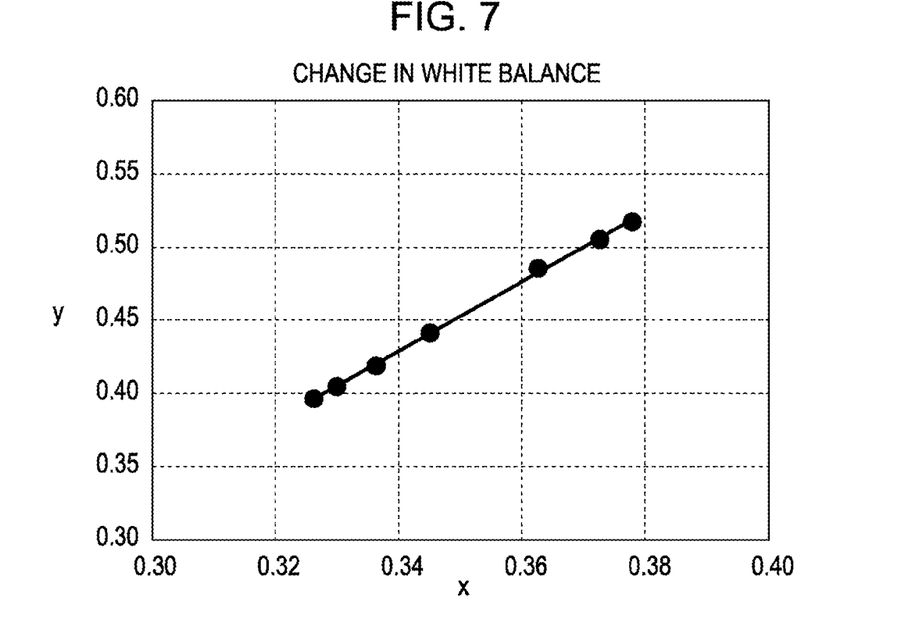
FIG. 7 is a graph showing a change in the white balance of an image displayed by a liquid crystal device according to a comparative example.
Figure 8:
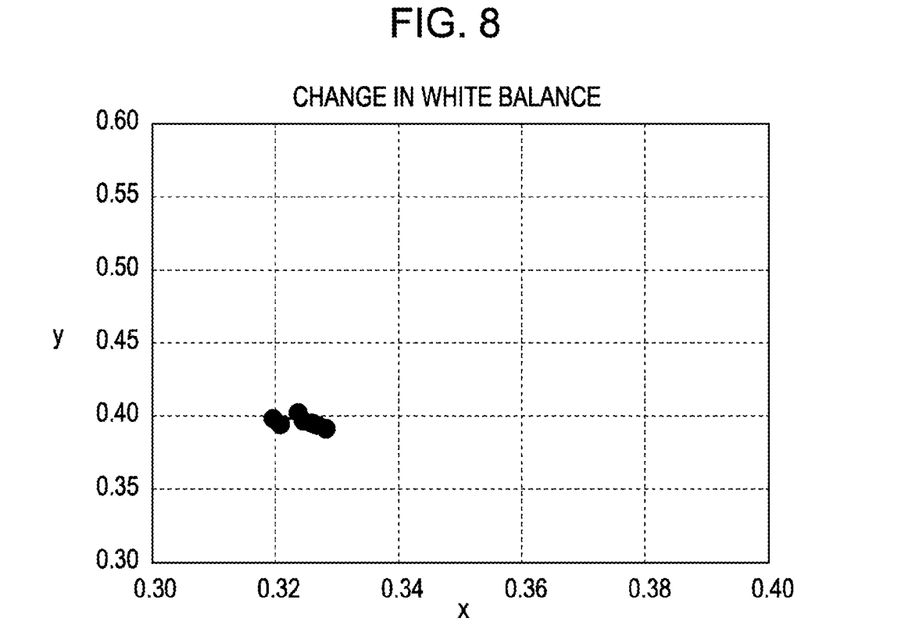
FIG. 8 is a graph showing a change in the white balance of an image displayed by the liquid crystal device according to the embodiment.

Next, operations and effects of the control device according to the present embodiment are described with reference to FIGS. 4 to 8. FIG. 5 is a flowchart of operations of the control device according to the present embodiment. FIG. 6 is a table showing relationships between light source control values and correction coefficients. FIG. 7 is a graph showing a change in the white balance of an image displayed by a liquid crystal device according to a comparative example. FIG. 8 is a graph showing a change in the white balance an image displayed by the liquid crystal device according to the present embodiment.

Referring to FIGS. 4 and 5, when the video signal analyzing circuit 210 receives a video signal, the video signal analyzer 211 analyzes the video signal (in step S1). The video signal analyzer 211 acquires, on the basis of the analysis of the video signal, information on the brightness and the like of a video image to be displayed on the basis of the video signal.

Next, the light source luminance control signal generator 212 generates a light source luminance control signal on the basis of the results of the analysis of the video signal (in step S2). When the video image that is to be displayed on the basis of the analyzed video signal is relatively bright, the light source luminance control signal includes a high light source control value. On the other hand, when the video image that is to be displayed on the basis of the analyzed video signal is relatively dark, the light source luminance control signal includes a low light source control value. The relationships between the results of the analysis of the video signals and the light source control values may be determined on the basis of pre-stored data or the like. The relationships between the results of the analysis of the video signals and the light source control values may be calculated in real time.

When the light source luminance control signal is generated, the video correction signal generator 213 generates a video correction signal in order to correct the video signal (in step S3). In this case, the video correction signal generator 213 generates the video correction signal using the table stored in the memory 214.

The table shown in FIG. 6 is stored in the memory 214, for example. Each of the light source control values is expressed by a percentage and used to control the output (i.e., consumed power) of the ultrahigh-pressure mercury lamp 500. Correction coefficients that are used to correct three video signals of red (R), green (G) and blue (B) colors, respectively, are stored in the table and correspond to each of the light source control values. The correction coefficients that correspond to RGB colors, respectively, can be calculated by the following method or the like.

First, color characteristics X, Y and Z of a white (W) color (determined by controlling the output of the light source), and color characteristics X, Y and Z of red, green and blue colors, are measured. The relationship between W and RGB is expressed by the following equation (1).

$$W = R + G + B \tag{1}$$

The relationship between the color characteristic $X_W$ of the W color and the color characteristics $X_R$, $X_G$, $X_B$ of the RGB colors, the relationship between the color characteristic $Y_W$ of the W color and the color characteristics $Y_R$, $Y_G$, $Y_B$ of the RGB colors, and the relationship between the color characteristic $Z_W$ of the W color and the color characteristics $Z_R$, $Z_G$, $Z_B$ of the RGB colors can be expressed using coefficients a and b by the following equations (2) to (4).

$$X_W = aX_R + X_G + bX_B \tag{2}$$

$$Y_W = aY_R + Y_G + bY_B \tag{3}$$

$$Z_W = aZ_R + Z_G + bZ_B \tag{4}$$

Next, coefficients x and y that are expressed by the following equations (5) and (6) are considered.

$$x = X/(X+Y+Z) \tag{5}$$

$$y = Y/(X+Y+Z) \tag{6}$$

The coefficients a and b are calculated so that the coefficients x and y are not changed from initial values. In this case, a correction coefficient for R is a; a correction coefficient for G is 1; and a correction coefficient for B is b. When the correction coefficient a or b is larger than 1, the correction coefficients are expressed by dividing the correction coefficients for RGB by a larger value of the correction coefficients a and b. For example, when a>b and a>1, the correction coefficient for R is a/a=1; the correction coefficient for G is 1/a; and the correction coefficient for B is b/a.

When a correction coefficient for a certain single video signal is 1, processing for the correction can be relatively simply performed. In the table shown in FIG. 6, since the correction coefficient for B is set to 1 as a reference, only two video signals of RG colors are actually corrected.

The table does not need to store correction coefficients for all light source control values that can be obtained. Even when a light source control value that is not stored in the table is determined, the value may be interpolated using a straight line approximation or the like so that an appropriate correction coefficient is calculated.

Returning to FIGS. 4 and 5, when the video correction signal is generated, the light source luminance controller 221 controls the luminance of the light source (in step S4) and the video signal corrector 231 corrects the video signal (in step S5). In this case, the control of the luminance of the light source and the correction of the video signal are performed in synchronization with each other. The synchronization can prevent a failure from occurring due to interference such as scroll noise.

The video signal corrector 231 outputs the corrected video signal to the liquid crystal device 100 (in step S6). The corrected video signal supports a change (caused by a change in the luminance of the light source) in the spectrum of the light. In other words, the corrected video signal can reduce a change (caused by the change in the spectrum of the light) in the white balance.

As shown in FIG. 7, if the luminance of the light source is controlled without the correction (described above) of the video signal, the chromaticity coordinates of the white color are linearly changed. In other words, the white balance is changed on the basis of the luminance of the light source. Thus, the quality of a displayed video image may be degraded.

As shown in FIG. 8, when the video signal is corrected by the control device according to the present embodiment, the chromaticity coordinates of the white color are not changed very much. In other words, even when the luminance of the light source is changed, the white balance is almost constant. Thus, it is possible to prevent the quality of a displayed video image from being degraded.

As described above, the control device according to the present embodiment performs the correction while supporting a change (caused by a change in the luminance of the light source) in the spectrum of the light. Thus, the display device such as the liquid crystal device can display a high-quality video image.

Electronic Device

Figure 9:
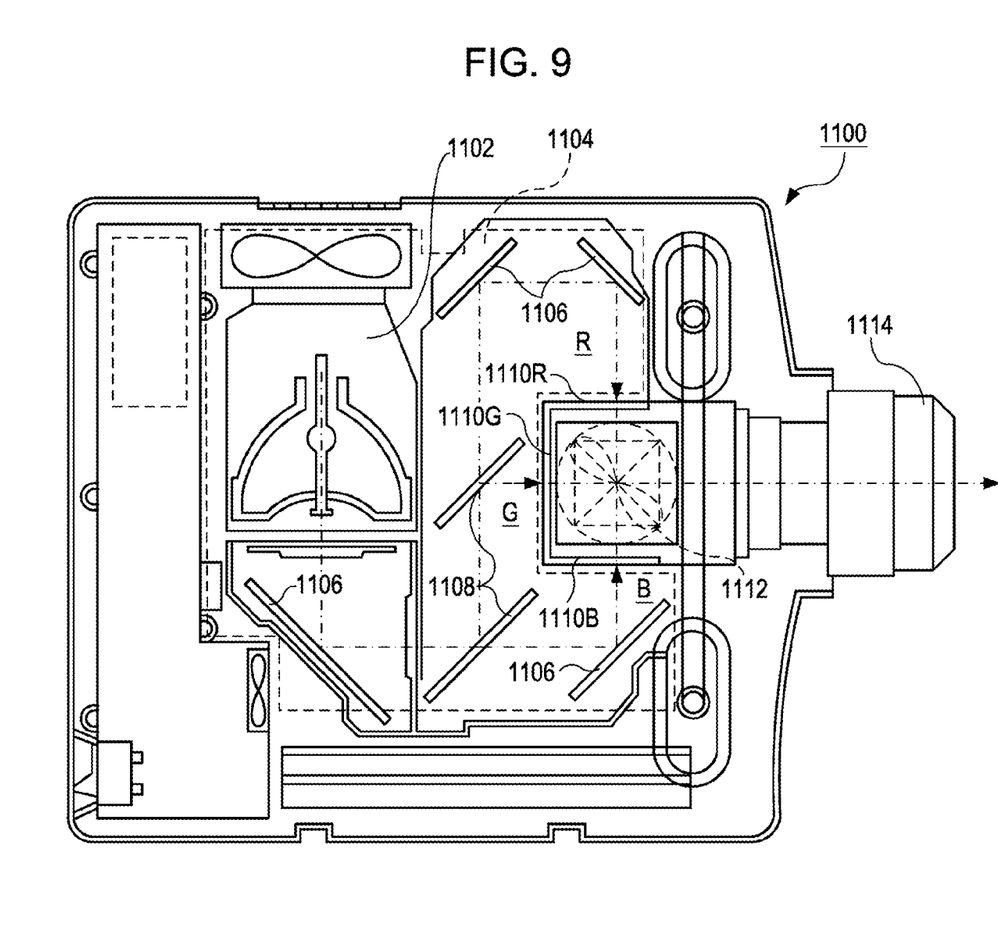
FIG. 9 is a plan view of the configuration of a projector that is an example of an electronic device that includes the control device and the liquid crystal device.

The following describes an electronic device that includes the control device and the liquid crystal device, which are described above. FIG. 9 is a plan view of an example of the configuration of a projector. The projector that uses the liquid crystal device as a light valve is described below.

As shown in FIG. 9, the projector 1100 has therein a lamp unit 1102 that includes a white light source such as an ultra-high-pressure mercury lamp. Light emitted by the lamp unit 1102 is separated into light components of RGB primary colors by four mirrors 1106 and two dichroic mirrors 1108. The light components of RGB primary colors are incident on liquid crystal panels 1110R, 1110G and 1110B, respectively. The liquid crystal panels 1110R, 1110G and 1110B serve as the light valve.

The configurations of the liquid crystal panels 1110R, 1110G and 1110B are the same as or similar to the configuration of the liquid crystal device described above. The liquid crystal panels 1110R, 1110G and 1110B are driven by RGB primary color signals (supplied from an image signal processing circuit), respectively. The liquid crystal panels 1110R, 1110G and 1110B modulate the incident light components. The modulated light components are incident on a dichroic prism 1112 from three directions. The light components of the R and B primary colors are refracted at 90 degrees by the dichroic prism 1112. The light component of the G primary color passes straight through the dichroic prism 1112. Thus, images of RGB primary colors are combined to form a color image. The color image is projected on a screen or the like through a projection lens 1114.

When attention is given to the images displayed by the liquid crystal panels 1110R, 1110G and 1110B, the image displayed by the liquid crystal panel 1110G needs to be reversed left to right.

The electronic device can be applied to a mobile personal computer, a mobile phone, a liquid crystal television, a viewfinder type video tape recorder, a direct monitor viewing type video tape recorder, a car navigation system, a pager, an electronic notebook, a calculator, a word processor, a workstation, a video phone, a point-of-sale (POS) terminal, a device that has a touch panel, and the like, in addition to the electronic device described with reference to FIG. 9.

The invention can be applied to a liquid crystal on silicon (LCOS) device, a digital micro-mirror device (DMD), an electrophoresis device and the like, in addition to the liquid crystal device described in the embodiment.

The invention is not limited to the aforementioned embodiment and may be modified without departing from the gist or spirit of the invention understood from the claims and this specification. A control device modified in such a manner and an electronic device provided with the control device are included in the technical scope of the invention.

The entire disclosure of Japanese Patent Application No. 2009-243626, filed Oct. 22, 2009 is expressly incorporated by reference herein.

What is claimed is:

1. A control device that controls a video signal to be input to a display device and controls the luminance of a light source that causes light to be incident on the display device, comprising:
    a video signal analyzing section that analyzes the video signal;
    a light source luminance control signal generating section that generates, on the basis of the results of the analysis, a light source luminance control signal that is used to control the luminance of the light source;
    a light source luminance control section that controls the luminance of the light source by means of the light source luminance control signal;
    a storage section that stores relationships between light source luminance control signals and video correction amounts;
    a video correction signal generating section that generates, on the basis of the video correction amount that is stored in the storage section and corresponds to the generated light source luminance control signal, a video correction signal that is used to correct the video signal;
    a video signal correcting section that corrects the video signal by means of the video correction signal; and
    a video signal output section that outputs the corrected video signal to the display device,
    wherein when a value of the video correction signal, which corresponds to the generated light source luminance control signal, is not stored in the storage section, the video correction signal generating section interpolates the value of the video correction signal on the basis of the video correction amounts stored in the storage section and generates the video correction signal.

2. The control device according to claim 1,
    wherein the video signal correcting section corrects the video signal in synchronization with the control of the luminance of the light source.

3. The control device according to claim 1,
wherein the video signal is constituted by at least three signals, and the video correction signal generating section generates the video correction signal as a signal that indicates coefficients that correspond to the at least three signals, respectively.

4. The control device according to claim 3,
wherein the video correction signal generating section sets one of the at least three signals as a reference signal and determines, on the basis of the reference signal, the coefficients that correspond to the other signals of the at least three signals.

5. An electronic device comprising:
a display device to which at least three video signals are input;
a light source that causes light to be incident on the display device; and
the control device according to claim 1.

* * * * *